United States Patent [19]
Cucchisi et al.

[11] Patent Number: 5,156,790
[45] Date of Patent: Oct. 20, 1992

[54] METHOD FOR EXTRUDING ETHYLENE POLYMERS

[75] Inventors: Joseph G. Cucchisi, So. Amboy; John C. Miller, Piscataway, both of N.J.

[73] Assignee: Union Carbide Chemicals & Plastics Technology Corporation, Danbury, Conn.

[21] Appl. No.: 735,869

[22] Filed: Jul. 25, 1991

[51] Int. Cl.5 .............................................. B29C 47/60
[52] U.S. Cl. ............................ 264/176.1; 264/211.21; 264/349; 366/81; 366/88; 425/208; 425/376.1
[58] Field of Search ...................... 264/349, 176.1, 169, 264/129, 337, 338, 211.21; 425/206, 207, 208, 209, 376.1; 366/88, 89, 81

[56] References Cited

U.S. PATENT DOCUMENTS

| | | | |
|---|---|---|---|
| 3,998,318 | 12/1976 | McAlarney | 425/208 |
| 4,310,484 | 1/1982 | Blakeslee | 366/88 |
| 4,329,313 | 5/1982 | Miller | 264/349 |
| 4,357,291 | 11/1982 | Miller et al. | 425/208 |
| 4,522,776 | 6/1985 | Ramamurthy | 264/338 |
| 4,642,041 | 2/1987 | Murphy | 366/88 |
| 4,746,220 | 5/1988 | Sukai et al. | 425/207 |
| 4,863,661 | 9/1989 | Maddy | 264/169 |
| 4,948,543 | 8/1990 | Pawlowski et al. | 425/376.1 |
| 4,996,919 | 3/1991 | Mansfield | 425/208 |

FOREIGN PATENT DOCUMENTS

| | | | |
|---|---|---|---|
| 0078515 | 5/1983 | European Pat. Off. | 425/208 |
| 45-28727 | 9/1970 | Japan | 425/208 |
| 59-106917 | 6/1984 | Japan | 264/338 |
| 61-279525 | 12/1986 | Japan | 425/376.1 |

*Primary Examiner*—Jeffery Thurlow
*Attorney, Agent, or Firm*—C. I. Vicari

[57] ABSTRACT

An improvement in the method for extruding ethylene polymers which are extruded through an extruder apparatus including an extruder screw having a screw root and a series of flights having a leading edge and a trailing edge. The extruder apparatus also has an inlet end and a discharge end and wherein the pitch ratio divided by the depth ratio is greater than $\frac{2}{3}$. The improvement provides a metallic coating selected from the group such as nickel coating or a matte chrome finish on the screw root and the leading and trailing edges of the flights, the coating being present in an amount sufficient to increase the output of the extruder screw.

15 Claims, 1 Drawing Sheet

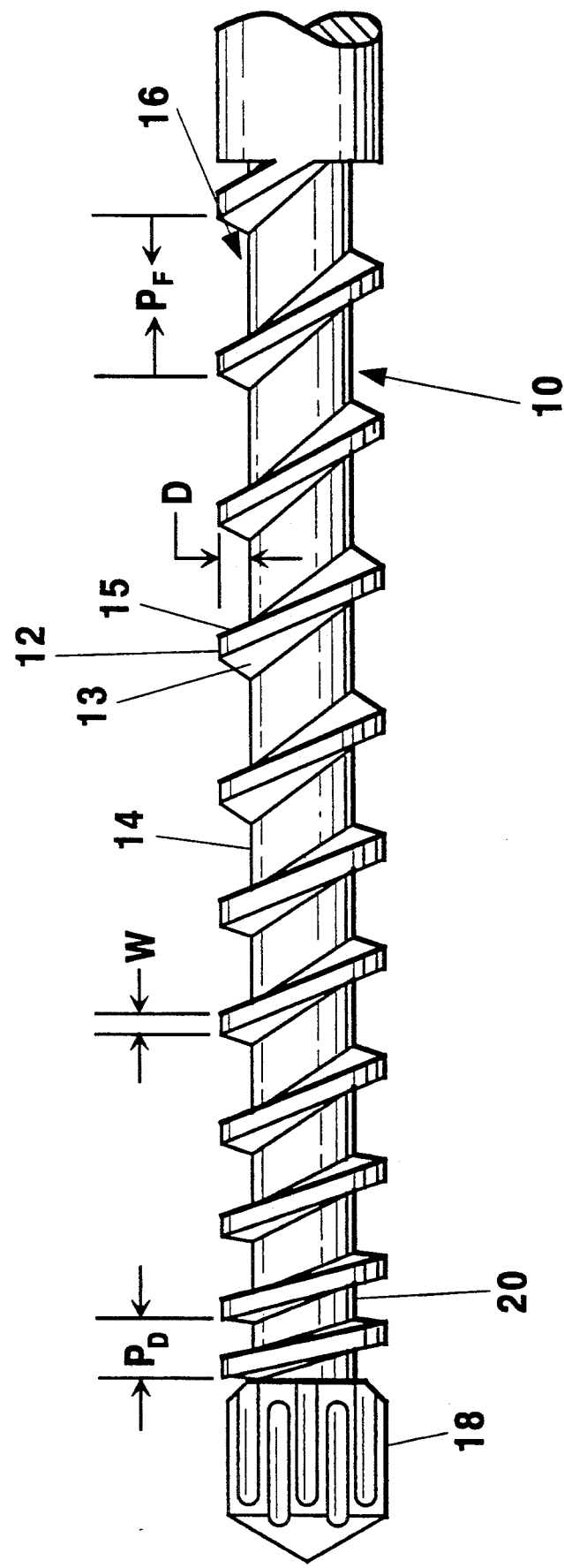

METHOD FOR EXTRUDING ETHYLENE POLYMERS

FIELD OF THE INVENTION

This invention relates to an improved method for extruding ethylene polymers.

BACKGROUND OF THE INVENTION

Over the years, film extrusion equipment has been optimized for the rheology of high pressure-low density polyethylene (HP-LDPE). More recently low pressure-low density polyethylene (LP-LDPE) has been increasingly used which has different rheological properties than HP-LDPE resins. The different molecular architecture of low pressure-low density polyethylene (LP-LDPE) results in a film processing behavior which requires different extrusion parameters. By way of background, conventional extruders commonly used for HP-LDPE include an elongated barrel which may be heated or cooled at various locations along its length and a screw which extends longitudinally through the barrel. The screw has a helical land on its surface which cooperates with the cylindrical internal surface of the barrel to define an elongated helical channel. Although the pitch of the screw may vary along the length thereof, it is common at the present time to utilize screws of constant pitch wherein the pitch is "square", that is, where the distance between adjacent flights is equal to the diameter. The screw is rotated about its own axis to work the plastic material and feed it toward the outlet end of the barrel.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

An extruder screw "metering" section has as its special function the exertion of a pumping action on the molten polymer. Ordinarily the throughput achieved by a screw is thought of a being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but, of course, it may effect such factors as back pressure and material viscosity, which factors, in turn, affect significantly the pressure flow component. On the other hand, pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections an extruder screw also may include a number of other distinct sections. Nearly all screws include, for example, so-called "transition" sections.

Over the years, there has been a trend toward the use of extruders capable of high outputs. In many applications, various economies in production are possible where high extruder outputs can be obtained on a reliable basis.

Although LP-LDPE resins can be extruded on equipment designed for HP-LDPE resins, such as described above, certain equipment modifications are often required in order to extrude the low pressure resins at optimum conditions and at rates comparable to the high pressure resins. This is particularly true during extrusion of LP-LDPE which is subsequently processed into film. The problem appears to be that when the new low pressure resins are extruded through equipment with screws designed for the earlier high pressure resin pellets, they suffer from the effects of high exit temperatures, decreased energy efficiency and reduced outputs due to power limitations.

U.S. Pat. No. 4,329,313 issued to J. C. Miller et al on May 11, 1982 and which is assigned to a common assignee, discloses an apparatus and method for extruding ethylene polymers. According to the disclosure in said patent, which is incorporated herein by reference, an extruder screw is provided having at least three segments wherein the pitch remains constant in each segment and changes abruptly from one segment to the following segment and wherein the pitch ratio divided by the depth ratio is greater than ⅔.

The extruder screw disclosed in said patent is particularly suitable for extruding linear low density narrow molecular weight distribution ethylene polymers produced by low pressure processes which, as explained previously, have different rheological properties than low density polyethylenes produced by the so called high pressure processes.

The present invention provides an improvement in the apparatus and method disclosed in U.S. Pat. No. 4,329,313 which improvement permits operation at reduced temperature and increased output of the extruder screw.

SUMMARY OF THE INVENTION

It is the general object of this invention to provide an improved method for dealing with problems of the types mentioned above.

Another object of this invention is to provide a method for achieving good extrudate metering performance at high rates.

These and other objects are achieved by an improvement in the method for extruding ethylene polymers wherein said polymers are passed through an extruder apparatus including an extruder screw having a screw root and a series of flights having a leading edge and a trailing edge, said apparatus having an inlet end and a discharge end and wherein the pitch ratio divided by the depth ratio is greater than $\frac{2}{3}$, the improvment comprising providing a metallic coating selected from the group consisting of a nickel coating and a chrome coating on said screw root and said leading and trailing edges of said flights, said chrome coating having a matte finish on its surface said coating being present in an amount sufficient to increase the output of said extruder screw.

BRIEF DESCRIPTION OF THE DRAWING

FIG. 1 is an elevational view of an extruder screw and mixer used for practicing the process of the instant invention of the invention.

DETAILED DESCRIPTION OF THE PREFERRED EMBODIMENTS

Although the drawing only illustrates an extruder screw and mixer for purposes of practicing the method of the present invention, it will be understood that the screw can be utilized in its normal environment, i.e., in cooperative association with conventional frame means, a horizontally extending barrel, feed and hopper means and a drive means all of which are not shown since, as mentioned previously, they constitute well-known apparatus commercially available to the art. Merely as illustrative, the extruder screw can be mounted in the apparatus as disclosed in U.S. Pat. Nos. 4,155,655 and 4,053,143.

The screw 10, as shown in FIG. 1 is a single stage screw, having a helical flight 12 of constant outside diameter with a leading edge 13 and a trailing edge 15 and includes a screw root 14.

Screw root 14 and leading edge 13 and trailing edge 15 are provided with a metallic coating selected from the group consisting of a nickel coating and a matte chrome coating which is present in an amount sufficient to increase the output of the extruder screw.

According to the method of the instant invention, the designated ethylene polymer is introduced into the apparatus for plastication and extrusion and enters the inlet end 16 of the extruder screw 10. Reference numeral $P_F$ designates the pitch in the inlet end 16 and as will be seen from FIG. 1, the pitch decreases uniformly along the length of the extruder screw 10. Situated adjacent to the mixing head 18 is the discharge end 20 of the extruder screw. Reference number $P_D$ designates the pitch in the discharge end of the extruder screw 10. Thus, and with reference to FIG. 1 of the drawing, the pitch decreases, preferably linearly, from the inlet end of the screw to the discharge end of the screw, and the decreasing pitch is substantially uniform as it proceeds from $P_f$ to $P_D$.

On the other hand the depth D of the screw remains substantially constant throughout the length of the screw.

The specific dimensions of the screw utilized in the process of the present invention can be determined empirically, calculated using conventional equations. Merely for purposes of illustration, the pitch $P_F$ can be approximately 2.5 inches and all succeeding pitches can be linearly uniformly decreased terminating with pitch $P_D$ which can be about 1.0 inch.

The depth D of the extruder screw is substantially constant throughout the entire length of the screw and the depth can vary depending on the size of the extruder. Moreover, the extruder screw 10 can have a length to diameter ratio of about 14 L/D to 24 L/D and preferably 16 L/D to 20 L/D. Finally, the width of the flight designated as W can vary from 0.001 diameter to 0.003 D inch.

As shown in FIG. 1 of the drawing, the extruder screw is utilized in conjunction with a mixing head or mixing section 18. The mixing section may be of the type which is referred to as "fluted mixing head" which is disclosed in U.S. Pat. No. 3,406,192 issued Dec. 30, 1969 to G. Leroy and entitled "Apparatus for Extrusion of Thermoplastics" or alternatively a Maddock Mixing Head.

The coatings can be applied to the leading and trailing edges and to the screw root by a variety of techniques such as by the electrolytic, electroless, plasma arc, detonation gun and the like techniques well known to the art. Since it is preferred that the top of the flights of the extruder not be provided with the metallic coatings of the present invention, they should be covered to prevent the coating material from adhering to the top of the flight.

Merely as illustrative the coatings can be applied by the techniques disclosed in the *Encyclopedia of Chemical Technology*, Vol. 8, "Diuretics to Emulsions" pages 738–751 and pages 826–869. The coatings of the present invention were applied by Peck Metal Co. of Dayton, Ohio.

Briefly, the coatings disclosed in the instant invention were applied in coating baths by electrolytic and electroless techniques. In the case of electrolytic coatings, they were applied by making the screw root and flights (after the tops of the flights were covered with tape) the cathode and applying an external directed current to the bath which contains chemical compounds of the metal to be coated. In the case of chrome, the coating bath produces a dull or matte chrome finish of the coating. The matte chrome finish is of the type which when measured by a "Microfinish Comparator" (a registered trademark of Yuasa International Inc. Carlstadt, N.J. 07022) measures 32G when compared to bright chrome which measures 2L.

In the case of electroless coatings, they were applied in a bath where a chemical reaction occurred to create metal ions which migrate to the metal object to be coated.

The thickness and amount of the applied coating should be in an amount sufficient to increase the screw output over conventional uncoated screws. In general the coatings can range from about 1 to about 3 mils in thickness preferably about 2 mils in thickness.

The ethylene polymers which can be used in the process of the present invention are those which are susceptible to extrusion such as those produced by slurry techniques, gas fluidized bed techniques, or those produced by the well known high pressure or low pressure processes. The preferred ethylene polymers are homopolymers of ethylene or copolymers of a major mol percent of ethylene, and a minor mol percent of one or more $C_3$ to $C_8$ alpha olefins. The $C_3$ to $C_8$ alpha olefins preferably do not contain any branching on any of their carbon atoms which is closer than the fourth carbon atom. The preferred $C_3$ to $C_8$ alpha olefins are propylene, butene-1, pentene-1, hexene-1 and octene-1.

The homopolymers can have a density of about $\geq 0.958$ to $\leq 0.972$ gms/cc and preferably of about $\leq 0.961$ to $\geq 0.968$ gms/cc.

The copolymers can have a density of about $\geq 0.88$ to $\leq 0.97$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus to achieve the same results, the copolymers, in terms of a given density, at a given melt index level, larger molar amounts of the different comonomers would be needed in the order of $C_3 > C_4 > C_5 > C_6 > C_7 > C_8$.

The polymers processed in the present invention are produced as granular materials which preferably have an average particle size of the order of about 0.005 to about 0.06 inches, and preferably of about 0.02 to about 0.04 inches, in diameter. The particle size is important for the purposes of readily fluidizing the polymer particles in the fluid bed reactor. The polymers of the present invention have a settled bulk density of about 15 to 32 pounds per cubic foot.

The homopolymers and copolymers of the present invention are useful for a variety of purposes and preferably for making film.

For film making purposes the preferred copolymers of the present invention are those having a density of about $\geq 0.917$ to $\leq 0.924$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 1.0$ to $\leq 4.0$. The films have a thickness of $>0$ to $\leq 10$ mils and preferably of $\geq 0$ to $\leq 5$ mils.

In a typical mode of operation, the specific ethylene polymer material to be extruded is introduced either in granular or pellet form into the inlet end 16 of the extruder screw. The material is then forced along the length of the extruder screw where it is compacted and compressed, thereby developing heat within the material and effect the beginning of melting of the solid material. As the material advances along the screw it continues to melt, initially interfaces between already molten polymer and solid compacted material, to a point where solid particles break up and small particles of solid polymer become dispersed in the main body of primarily molten polymer material. This action continues until the polymer melt is passed to the optional final section, i.e., mixing head 18. Final mixing and homogenization of the polymer material is carried out in the fluted screw mixing section. As the material is broken into a number of streams, each entering successive inlet fluted passages, it is forced from such passages over intervening lands into outlet flutes which discharge the highly mixed molten material from the fluted mixing head 18 and into the discharge end of the extruder housing (not shown). Operating conditions such as temperatures, pressures, etc. are advantageously lower than would be expected.

Having set forth the general nature of the invention, the following examples illustrate some specific embodiments of the invention. It is to be understood, however, that this invention is not limited to the examples, since the invention may be practiced by the use of various modifications.

EXAMPLE I

An uncoated steel decreasing pitch extruder screw was compared with a nickel coated screw and matte chrome coated extruder screw as substantially shown in FIG. 1. The output was evaluated with respect to low pressure low density polyethylene resins (LP LDPE) contemplated for treatment according to the present invention. The screw was contained in a conventional ground barrel extruder built according to substantially industry practice. The LP LDPE resin was an ethylene-butene copolymer which is available from Union Carbide Chemicals and Plastics Company Inc. under the trade name designation DFDA 7047. The copolymer had the following nominal properties:

Density: 0.918 gms/cc
Melt Index: 1.0 gms/10 minutes
Melt Flow Ratio: 27
Bulk Density: 33 lbs/ft$^3$ The extruder screw included a mixing head of the type disclosed in U.S. Pat. No. 3,406,192 and the entire assembly had a length to diameter ratio of 24/1, and without the mixing head it had a 22/1 ratio. The length was 60 inches and the flight depth was 0.450 inches. The coatings were applied by electrolytic processes and had a 2 mil thickness coating. The length of the lead was as indicated below:

| Flight No. | Head In. | |
|---|---|---|
| 1 | 2.5 | Double Flight |
| 2 | 2.5 | Double Flight |
| 3 | 2.5 | Double Flight |
| 4 | 2.5 | Double Flight |
| 5 | 2.5 | Double Flight |
| 6 | 2.5 | Double Flight |
| 7 | 2.5 | Double Flight |
| 8 | 2.5 | Double Flight |
| 9 | 2.5 | Double Flight |
| 10 | 2.5 | Double Flight |
| 11 | 2.3 | Single Flight |
| 12 | 2.1 | Single Flight |
| 13 | 1.9 | Single Flight |
| 14 | 1.8 | Single Flight |
| 15 | 1.7 | Single Flight |
| 16 | 1.7 | Single Flight |
| 17 | 1.7 | Single Flight |
| 18 | 1.7 | Single Flight |
| 19 | 1.7 | Single Flight |
| 20 | 1.7 | Single Flight |
| 21 | 1.7 | Single Flight |
| 22 | 1.7 | Single Flight |
| 23 | 1.7 | Single Flight |
| 24 | 1.7 | Single Flight |

-continued

| Flight No. | Head In. | |
|---|---|---|
| 25 | 1.7 | Single Flight |

The Pitch ratio divided by the depth ratio was 1.5.

Table 1 illustrates the operating conditions and results:

TABLE I

| | Uncoated | Matte Chrome | Nickel |
|---|---|---|---|
| Screw Speed (RPM) | 50 | 50 | 50 |
| Head Pressure (psi) | 5000 | 5000 | 5000 |
| Output (lbs/hr.) | 105 | 150 | 145 |
| Exit Temperature (°F.) | 414 | 407 | 403 |
| Power (H.P.) | 16 | 19 | 19 |

As will be seen from the results indicated in Table 1, the output of the uncoated trailing and leading edges and the screw root was 105 lbs/hr whereas the matte chrome coating had an output of 150 lbs/hr. and the nickel coating had an output of 145 lbs/hr.

EXAMPLE 2

This example compares the results of extruder screw output of a bright chrome finish versus a matte chrome coating on the leading and trailing edges and the screw root of an extruder screw substantially as shown in FIG. 1.

The output was evaluated with respect to high pressure low density polyethylene (HP-LDPE) resins contemplated for treatment according to the present invention. The screw was contained in a conventional smooth barrel extruder built according to substantially industry practice. The HP-LDPE resin was an ethylene homopolymer which is available from Union Carbide Chemicals and Plastics Company Inc. under the trade name designation DYNK. The copolymer had the following nominal properties:

Density: 0.918 gms/dec
Melt Index: 0.3
Bulk Density: 33 lbs/ft$^3$

The extruder screw included a mixing head of the type disclosed in U.S. Pat. No. 3,406,162 and the entire assembly had a length to diameter ratio of 24/1, and without the mixing head it had a 22/1 ratio. The length was 60 inches and the flight was 0.450 inches. The coating was of about 2 mil thickness. The matte chrome finish resulted from an electrolytic procedure and was present on the leading and trailing edges and the screw root and was determined by a "Microfinish Comparator" which measured 32G. The length of the lead and pitch ratio was as indicated in Example 1.

Table II illustrates the operating conditions and results:

TABLE II

| | Bright Chrome | Matte Chrome |
|---|---|---|
| Screw Speed (RPM) | 75 | 75 |
| Head Pressure (psi) | 5000 | 5000 |
| Output (lbs/hr. RPM) | 99.75 | 120.0 |
| Melt Temperature (°F.) | 365 | 366 |
| Barrel Temp, °F. | 350 | 350 |
| Power (H.P.) | 12.3 | 13.2 |

As will be seen from the results indicated in Table II, the output of the matte chrome finish screw had an increase of about 20% over the bright chrome finish screw.

What is claimed is:

1. An improvement in the method for extruding ethylene polymers wherein said polymers are passed through an extruder apparatus including an extruder screw having a screw root and a series of flights having a leading edge and a trailing edge, said apparatus having an inlet end and a discharge end and wherein the pitch ratio divided by the depth ratio is greater than $\frac{5}{8}$, the improvment comprising providing a metallic coating selected from the group consisting of nickel coating and a matte chrome finish solely to said screw root and said leading and trailing edges of said flights of said screw said coating being present in an amount sufficient to increase the output of said extruder screw.

2. The improvement according to claim 1 wherein said metallic coating is a nickel coating.

3. The improvement according to claim 1 wherein said metallic coating is a matte chrome coating.

4. The improvement according to claim 1 wherein the thickness of said metallic coating is about 1 to 3 mils.

5. The improvement according to claim 1 wherein the thickness of said metallic coating is about 2 mils.

6. The improvement according to claim 1 wherein said ethylene polymers are homopolymers of ethylene or copolymers of a major mol percent of ethylene and a minor mol percent of one or more $C_3$ to $C_8$ alpha olefins.

7. The improvement according to claim 6 wherein said copolymers have a density range of about $\geq 0.88$ to about $\leq 0.97$ gms/cc.

8. The improvement according to claim 6 wherein said copolymers have a density range of about $\geq 0.917$ to about $\leq 0.955$ gms/cc.

9. An improvement in the method for extruding ethylene polymers having a density of $\geq 0.88$ to about $\leq 0.97$ gms/cc wherein said polymers are passed through an extruder apparatus including an extruder screw having a screw root and a series of flights having a leading edge and a trailing edge, said apparatus having an inlet end and a discharge end and wherein the pitch ratio divided by the depth ratio is greater than $\frac{5}{8}$, the improvment comprising providing a nickel coating solely to said screw root and said leading and trailing edges of said flights of said screw said coating being of a thickness of 1-3 mils.

10. The improvement according to claim 9 wherein the thickness of said metallic coating is about 2 mils.

11. The improvement according to claim 9 wherein said ethylene polymers are homopolymers of ethylene or copolymers of a major mol percent of ethylene and a minor mol percent of one or more $C_3$ to $C_8$ alpha olefins.

12. The improvement according to claim 11 wherein said copolymers have a density range of about $\geq 0.917$ to about $\leq 0.955$ gms/cc.

13. An improvement in the method for extruding ethylene polymers having a density of $\geq 0.88$ to about $\leq 0.97$ gms/cc wherein said polymers are passed through an apparatus including an extruder screw having a screw root and a series of flights having a leading edge and a trailing edge, said apparatus having an inlet end and a discharge end and wherein the pitch ratio divided by the depth ratio is greater than $\frac{5}{8}$, the improvement comprising providing a matte chrome coating solely to said screw root and said leading and trailing edges of said flights of said screw said matte chrome coating being of a thickness of about 1-3 mils.

14. The improvement according to claim 13 wherein the thickness of said matte chrome coating is about 2 mils.

15. The improvement according to claim 13 wherein said ethylene polymers are homopolymers of ethylene or copolymers of a major mol percent of ethylene and a minor mol percent of one or more $C_3$ to $C_8$ alpha olefins.

* * * * *